UNITED STATES PATENT OFFICE.

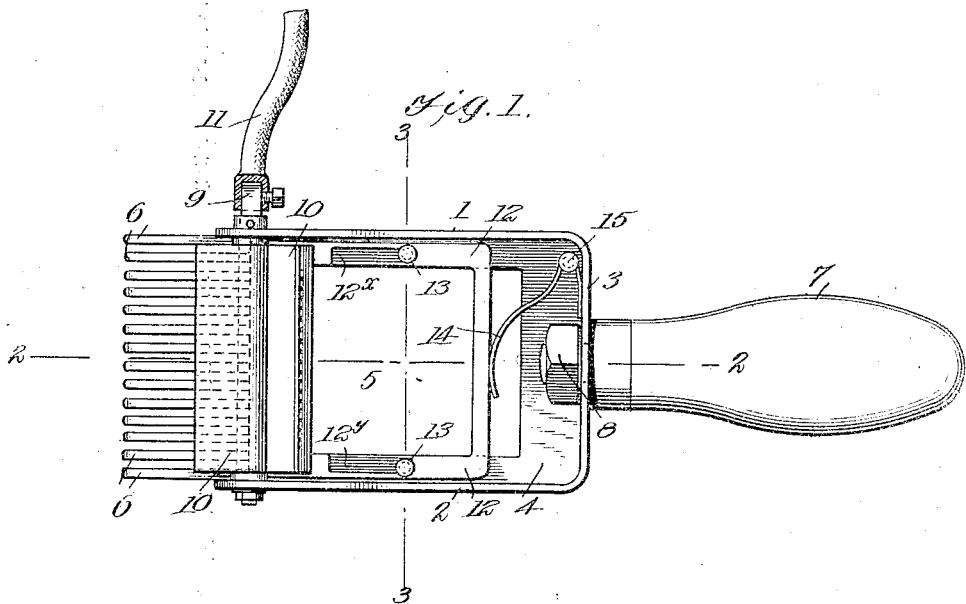

CHARLES W. SMITH, OF BERLIN, WISCONSIN.

MACHINE FOR PICKING PIN-FEATHERS FROM FOWLS.

1,037,067.  Specification of Letters Patent.  Patented Aug. 27, 1912.

Application filed February 11, 1911. Serial No. 607,915.

*To all whom it may concern:*

Be it known that I, CHARLES W. SMITH, a citizen of the United States, and a resident of Berlin, in the county of Green Lake and State of Wisconsin, have made certain new and useful Improvements in Machines for Picking Pin-Feathers from Fowls, of which the following is a specification.

My invention relates to devices for picking pin-feathers from fowls, more particularly for picking pin-feathers from poultry, and it consists in the combinations, constructions and arrangements herein described and claimed.

An object of my invention is to provide a device by means of which the pin-feathers may be removed from poultry in much less time than in the ordinary manual operation.

A further object of my invention is to provide a machine for picking pin-feathers which will effectively accomplish the operation without injury to the fowl.

A further object of my invention is to provide a device for accomplishing the above named objects which has few parts, is simple in operation, and is therefore not liable to get out of order.

Other objects and advantages will appear in the following specification and the novel features of the device will be particularly pointed out in the appended claims.

My invention is illustrated in the accompanying drawings forming part of this application, in which—

Figure 1 is a plan view of the device, Fig. 2 is a section along the line 2—2 of Fig. 1, and Fig. 3 is a section along the line 3—3 of Fig. 1.

Referring now particularly to Fig. 1, I have shown therein a U-shaped frame consisting of the sides 1 and 2, a back 3, and a bottom 4. The latter is provided with a central opening 5, and is provided at its forward edge with a series of teeth 6 which constitute, in fact, a comb. A handle 7 is secured to the back 3 of the frame by means of a nut 8. Rotatively mounted between the arms 1 and 2 of the frame is a shaft 9 bearing a series of curved arms 10 (see Fig. 2). The shaft 9 is prolonged through the member 1 and to it is secured a flexible driving member 11, which is designed to be connected with a motor (not shown). Within the frame is a slidable plate 12 having a central opening 12ª arranged to register with the opening 5. The plate bears upon the bottom 4 and is provided with the slots 12ˣ and 12ʸ on each side which are arranged to receive pins 13 extending upwardly from the bottom 4. The plate 12 is normally kept in a forward position by means of a spring 14 which is secured to a pin 15. In Fig. 1, I have shown the plate in its forward position, the front edge being in a position to be engaged by the curved arms or blades 10.

From the foregoing description of the various parts of the device the operation thereof may be readily understood. The machine is used in a similar manner to power driven horse clippers. The flexible member 11 in rotating drives the blades 10 in the direction shown by the arrow in Fig. 2. The device is held by the handle 7 and the comb 6 is run along the body of the fowl 15 underneath the pin-feathers 16 which are caught between the edges of the rapidly revolving blades 10 and the forward edge of the plate 12. The continued rotation of the blades 10 pushes the plate rearwardly against the tension of the spring 14, and in so doing the feathers are caught between the edges of the blades and the plate and are pulled out. When the blade has passed far enough to clear the plate the latter springs back and is met by the next blade. This is repeated, and as the blades are revolving rapidly the device may be pushed forward so as to quickly remove the pin-feathers from the fowl. The comb prevents any danger of the flesh of the fowl from being injured, but holds the flesh firmly in place while the pin-feathers are being drawn out.

I claim:

1. In a device for plucking pin-feathers from fowls, a comb arranged to enter between the feathers, a spring-pressed slidable plate disposed above said comb, and a series of revoluble blades arranged to engage the edge of said slidable plate for frictionally holding the pin-feathers, said blade and said plate having a conjoint movement for pulling said pin-feathers through said comb.

2. In a device for plucking pin-feathers from fowls, a U-shaped frame, a comb carried thereby, a plate slidably disposed on the bottom of said U-shaped frame, a spring secured to the frame for normally holding the plate in a forward position, means for guiding the plate and for limiting its movement, a shaft rotatably carried by said frame, a series of curved blades carried by said shaft the edges of the blades being arranged to engage the forward edge of the plate so as to move the latter rearwardly against the tension of the spring, a further movement of the blade serving to clear the plate and permit it to resume its normal forward position.

CHARLES W. SMITH.

Witnesses:
 DONALD W. GREEN,
 RALPH K. HOOVER.